US012533997B2

(12) United States Patent
Kawashiri

(10) Patent No.: US 12,533,997 B2
(45) Date of Patent: Jan. 27, 2026

(54) BATTERY-TEMPERATURE RAISING APPARATUS

(71) Applicant: SUBARU CORPORATION, Tokyo (JP)

(72) Inventor: Takahiro Kawashiri, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 163 days.

(21) Appl. No.: 18/591,112

(22) Filed: Feb. 29, 2024

(65) Prior Publication Data
US 2024/0317113 A1 Sep. 26, 2024

(30) Foreign Application Priority Data
Mar. 22, 2023 (JP) .................... 2023-044897

(51) Int. Cl.
*B60L 58/34* (2019.01)
*B60L 7/26* (2006.01)
*B60T 1/06* (2006.01)
*B60T 8/171* (2006.01)
*F16H 57/04* (2010.01)
(Continued)

(52) U.S. Cl.
CPC ............ *B60L 58/34* (2019.02); *B60L 7/26* (2013.01); *B60T 1/062* (2013.01); *B60T 8/171* (2013.01); *F16H 57/0413* (2013.01); *F16H 57/0415* (2013.01); *F16H 57/0452* (2013.01); *F16H 59/72* (2013.01); *F16H 61/0059* (2013.01); *B60L 2240/545* (2013.01);
(Continued)

(58) Field of Classification Search
CPC .. B60L 2240/36; B60L 7/26; B60L 2240/545; B60L 2250/26; B60L 58/34; F16H 57/0415; F16H 57/0452; F16H 57/0447; F16H 59/72; F16H 61/0059; F16H 57/0413; B60T 1/062; B60T 8/171; B60T 2270/604; B60T 2220/04
See application file for complete search history.

(56) References Cited

U.S. PATENT DOCUMENTS 9,435,423 B2 * 9/2016 Miyamoto .......... F16H 61/0028
10,309,528 B2 * 6/2019 Katakura ................ F16H 59/14
(Continued)

FOREIGN PATENT DOCUMENTS

JP    2010-119171 A    5/2010

*Primary Examiner* — Thai T Dinh
(74) *Attorney, Agent, or Firm* — TROUTMAN PEPPER LOCKE LLP

(57) ABSTRACT

A battery-temperature raising apparatus includes a battery, a transmission, an oil pan, a heat-retaining oil tank, a heat exchanger, a first valve, a temperature sensor, and a control unit. The transmission includes a transmission mechanism that converts torque and a clutch capable of braking a wheel. The oil pan and the oil tank are disposed in the transmission and are in communication with the heat exchanger that exchanges heat between the battery and oil. The first valve opens and closes a path joining the oil tank and the heat exchanger. The control unit generates braking force by controlling engagement force of the clutch depending on an amount of depression of a brake pedal. The control unit supplies the oil stored in the oil tank to the heat exchanger by opening the first valve when a temperature of the battery detected by the temperature sensor is below a predetermined temperature.

5 Claims, 5 Drawing Sheets

(51) Int. Cl.
  *F16H 59/72*     (2006.01)
  *F16H 61/00*     (2006.01)
(52) U.S. Cl.
  CPC ..... *B60T 2220/04* (2013.01); *B60T 2270/604* (2013.01); *Y02T 10/70* (2013.01)

(56) References Cited

U.S. PATENT DOCUMENTS 11,441,670 B2 * 9/2022 Fujii ...................... B60K 25/00
12,018,749 B2 * 6/2024 Murazumi ............ B60W 10/06
12,281,700 B2 * 4/2025 Murazumi .......... F16H 61/0025

* cited by examiner

FIG. 4

| | | WARMING OIL | | STORING HEAT IN OIL | | WARMING BATTERY | | | COOLING TRANSMISSION | |
|---|---|---|---|---|---|---|---|---|---|---|
| | | | | | | HIGH | | | | |
| | | BELOW PREDETERMINED VALUE | EQUAL TO PREDETERMINED VALUE OR HIGHER | BELOW PREDETERMINED VALUE | EQUAL TO PREDETERMINED VALUE OR HIGHER AND BELOW THIRD PREDETERMINED VALUE | BELOW PREDETERMINED VALUE | EQUAL TO PREDETERMINED VALUE OR HIGHER | | BELOW PREDETERMINED VALUE | EQUAL TO PREDETERMINED VALUE OR HIGHER |
| BATTERY | REMAINING BATTERY CHARGE (SOC) | | | | | | | | | |
| MG | BATTERY TEMPERATURE | | | | | | | | | |
| | REGENERATIVE BRAKING | NO | NO | NO | NO | NO | NO | | NO | NO |
| TRANSMISSION | OIL TEMPERATURE | BELOW SECOND PREDETERMINED VALUE | | EQUAL TO SECOND PREDETERMINED VALUE OR HIGHER AND BELOW THIRD PREDETERMINED VALUE | | EQUAL TO SECOND PREDETERMINED VALUE OR HIGHER AND BELOW THIRD PREDETERMINED VALUE | | | EQUAL TO THIRD PREDETERMINED VALUE OR HIGHER | |
| | OIL CIRCULATION PATH | OIL PAN→OIL TANK→OIL PAN→LUBRICATING TRANSMISSION | | GENERATING HEAT AT CLUTCH→RISE IN OIL TEMPERATURE→OIL TANK | | GENERATING HEAT AT CLUTCH→RISE IN OIL TEMPERATURE→OIL TANK→OIL PUMP→HEAT EXCHANGER→OIL PAN | GENERATING HEAT AT CLUTCH→RISE IN OIL TEMPERATURE→OIL TANK | | GENERATING HEAT AT CLUTCH→RISE IN OIL TEMPERATURE→OIL TANK→OIL PUMP→HEAT EXCHANGER→OIL PAN | TRANSMISSION→OIL COOLER |
| | FIRST VALVE | CLOSED | OPEN | CLOSED | CLOSED | OPEN | CLOSED | | OPEN | CLOSED |
| | SECOND VALVE | OPEN | | CLOSED | CLOSED | CLOSED | CLOSED | | CLOSED | OPEN |
| | VALVE TO OIL COOLER | CLOSED | | CLOSED | CLOSED | CLOSED | CLOSED | | CLOSED | OPEN |
| HEAT TRANSFER | STORING HEAT IN OIL TANK | NO | YES | YES | YES | NO | YES | | | NO |
| | BRAKING CLUTCH (GENERATING HEAT) | YES | NO | YES | YES | YES | YES | | NO | NO |
| | RELEASING HEAT TO BATTERY | NO | NO | NO | NO | YES | NO | | NO | NO |
| BRAKING VEHICLE AND RELEASING HEAT | | | | | | | | | STRONG | |

FIG. 5

BATTERY-TEMPERATURE RAISING APPARATUS

CROSS-REFERENCE TO RELATED APPLICATION

The present application claims priority from Japanese Patent Application No. 2023-044897 filed on Mar. 22, 2023, the entire contents of which are hereby incorporated by reference.

BACKGROUND

The disclosure relates to a battery-temperature raising apparatus configured to supply electric power to an electric motor configured to generate driving force for a vehicle.

In recent years, battery electric vehicles (BEV), which are driven by an electric motor and emit no exhaust gas, have been in practical use. Such electric vehicles include a high-voltage battery (hereinafter, also referred to simply as a "battery") configured to supply electric power to an electric motor (or store regenerated electric power).

A battery has a tendency (characteristic) to increase in internal resistance and degrade in charging-discharging characteristics with a decrease in temperature. Thus, for example, when the temperature is low outside and the battery is cold, it takes long to charge the battery.

Japanese Unexamined Patent Application Publication (JP-A) No. 2010-119171 discloses a technology for performing temperature-raising control for a battery by operating a step-up converter when the temperature of the battery is lower than a reference temperature and the state of charge (SOC) of the battery is higher than a reference value. In more detail, step-up operation and step-down operation of the step-up converter is alternately repeated in the temperature-raising control for the battery. Thus, charging and discharging the battery are alternately repeated, and current flows through the battery, generating Joule heat in the battery and leading to an increase in the temperature of the battery. In short, the electric energy of the battery is converted into thermal energy, leading to an increase in the temperature of the battery.

This process terminates a low-temperature state of the battery, and the battery more readily accepts charging electric power. Thus, when the battery is charged, the state of charge (SOC) of the battery may quickly return to a controllable range.

SUMMARY

An aspect of the disclosure provides a battery-temperature raising apparatus including a battery, a transmission, an oil pan, a heat-retaining oil tank, a heat exchanger, a first valve, a temperature sensor, and a control unit. The battery is configured to supply electric power to an electric motor configured to generate driving force for a vehicle. The transmission includes a transmission mechanism and a clutch. The transmission mechanism is configured to convert torque provided by the electric motor and output the converted torque, and the clutch is configured to brake a wheel of the vehicle through engagement. The oil pan is disposed at a bottom of the transmission and is configured to store oil to be supplied to the transmission mechanism and the clutch. The tank is capable of retaining heat and disposed in the transmission and is configured to store the oil drawn up from the oil pan by the transmission mechanism. The heat exchanger includes an inlet in communication with the oil tank and an outlet in communication with the oil pan and is configured to exchange heat between the battery and the oil. The first valve is disposed in a first oil path joining the oil tank and the inlet of the heat exchanger and is configured to open and close the first oil path. The temperature sensor is configured to detect a temperature of the battery. The control unit is configured to control engagement and disengagement of the clutch and opening and closing of the first valve. The control unit is configured to generate braking force by controlling engagement force of the clutch depending on an amount of depression of a brake pedal of the vehicle. The control unit is configured to supply the oil stored in the oil tank to the heat exchanger by opening the first valve when the temperature of the battery is below a predetermined temperature.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4 illustrates Table 1 for describing operation of the battery-temperature raising apparatus according to the embodiment (when the SOC is high and regeneration is not allowed); and FIG. 5 illustrates Table 2 for describing operation of the battery-temperature raising apparatus according to the embodiment (when the SOC is low and regeneration is allowed).

DETAILED DESCRIPTION

As described above, using the technology disclosed in JP-A No. 2010-119171, it is possible to reduce the charging time of the battery by heating the battery. However, since the electric power (electric energy) of the battery is used to heat the battery, that is, the temperature of the battery is raised by using the electric power of the battery itself in the technology disclosed in JP-A No. 2010-119171, electricity efficiency (fuel efficiency for a vehicle such as a hybrid electric vehicle (HEV)) degrades, shortening the range (the distance that a vehicle is able to travel).

It is desirable to provide a battery-temperature raising apparatus capable of heating a battery more efficiently without using the electric power of the battery for powering an electric motor, that is, without degrading electricity efficiency (fuel efficiency).

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
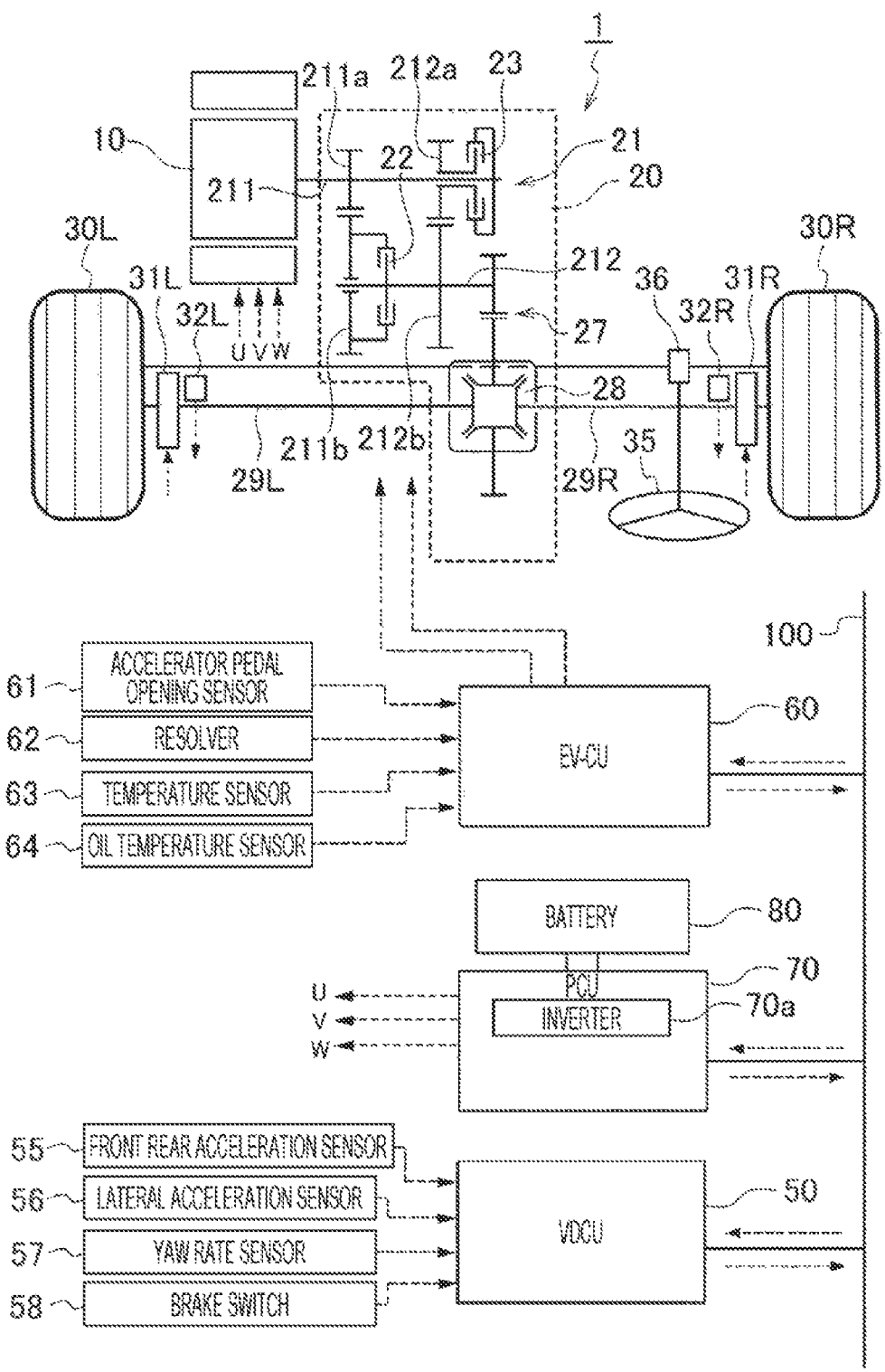
FIG. 1 is a block diagram illustrating a configuration of a battery-temperature raising apparatus according to an embodiment.
Figure 2:
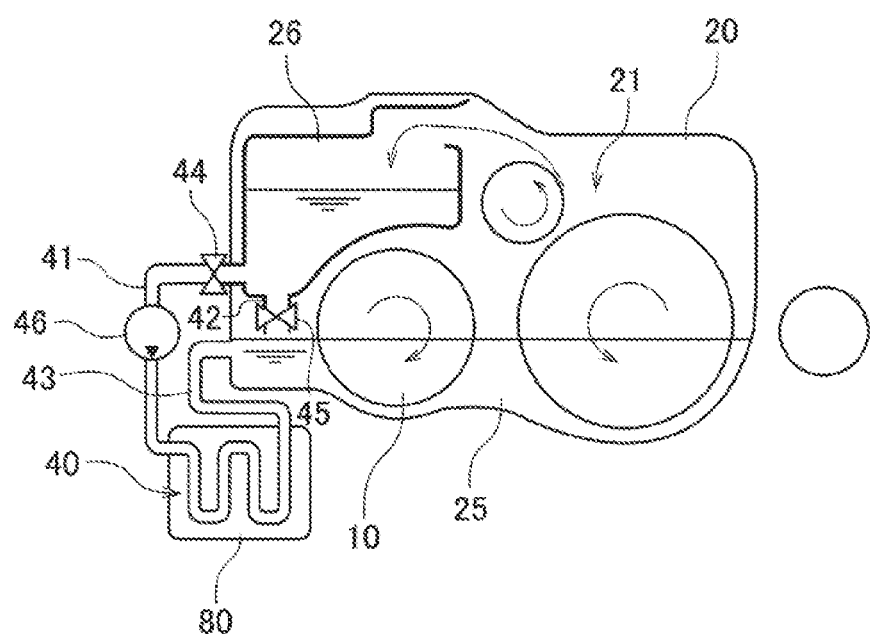
FIG. 2 is a cross-sectional view schematically illustrating a configuration of a transmission.

First, referring to both FIGS. 1 and 2, a configuration of a battery-temperature raising apparatus 1 according to the embodiment will be described. FIG. 1 is a block diagram illustrating a configuration of the battery-temperature raising apparatus 1. FIG. 2 is a cross-sectional view schematically illustrating a configuration of a transmission 20.

An electric motor (motor generator) 10 is configured as a synchronous power-generating motor (three-phase alternating-current synchronous motor) serving as a motor configured to convert supplied electric power into mechanical power and also serving as a generator configured to convert received mechanical power into electric power. In short, the electric motor 10 is configured to operate as a motor for generating driving torque in a driving mode of a vehicle and as a generator in a regenerating mode. The electric motor 10 is controlled by EV-CU 60, which will be described below.

The electric motor 10 is coupled to a battery 80 with an inverter 70a interposed therebetween. When the electric motor 10 operates as a motor, the inverter 70a converts direct-current power supplied from the battery 80 into alternating-current power to drive the electric motor 10. When the electric motor 10 operates as a generator, the inverter 70a converts alternating-current power generated by the electric motor 10 into direct-current power to charge the battery 80.

In short, the battery 80 is configured to supply electric power to the electric motor 10, which is the driving force for a vehicle, or store regenerated electric power. The battery 80 includes, for example, substantially prism-shaped stacks (battery modules). Each stack includes battery cells and separators being alternately stacked. Each battery cell is, for example, a substantially rectangular prismatic battery contained in a prism-shaped can. In some embodiments, a lithium ion battery is used as a battery cell. In addition to a lithium ion battery, examples of a battery cell also include a rechargeable secondary battery such as a nickel-metal hydride battery.

A temperature sensor 63 is attached to the battery 80 to detect the temperature of the battery 80. The temperature sensor 63 is coupled to the EV-CU 60 described below, and the EV-CU 60 acquires an electric signal (voltage value) that depends on the battery temperature. In some embodiments, for example, a thermistor, which changes a resistance value with temperature, is used as the temperature sensor 63.

The output shaft of the electric motor 10 is coupled to the automatic transmission (AT) 20 (also referred to simply as the "transmission" below) configured to convert the driving force provided by the electric motor 10 and output the driving force obtained through conversion. Examples of the automatic transmission 20 include a parallel two-shaft stepped automatic transmission configured to provide a finite number of transmission stages (two stages in the embodiment) by selectively switching, through engagement and disengagement of clutches, between the combinations of gear trains disposed on a pair of shafts disposed in parallel.

For example, the automatic transmission 20 includes an input shaft 211 to be driven by the electric motor 10 and an output shaft 212 disposed parallel to the input shaft 211 and to be coupled to the drive wheel. A first-speed drive gear 211a is fixed to the input shaft 211, and a second-speed drive gear 212a is rotatably attached to the input shaft 211. A first-speed driven gear 211b is rotatably attached to the output shaft 212, and a second-speed driven gear 212b is fixed to the output shaft 212. The drive gears 211a and 212a engage with the driven gears 211b and 212b, respectively, and the drive gears 211a and 212a and the driven gears 211b and 212b form a transmission gear train, that is, transmission stages.

A first clutch 22 is attached to the output shaft 212 to switch between the power transmission state and the neutral state of the first-speed transmission stage. A second clutch 23 is attached to the input shaft 211 to switch between the power transmission state and the neutral state of the second-speed transmission stage. When the first clutch 22 engages and the second clutch 23 disengages, the first speed is set. When the second clutch 23 engages and the first clutch 22 disengages, the second speed is set. In other words, the first clutch 22 engages when the first transmission stage (transmission ratio) is selected, and the second clutch 23 engages when the second transmission stage (transmission ratio) is selected. In this way, the drive gears 211a and 212a, the driven gears 211b, 212b, the first clutch 22, and the second clutch 23 serve as a transmission mechanism 21.

While the first transmission stage is selected and the first clutch 22 is engaged, controlling engagement force of the second clutch 23 generates braking force depending on the engagement force. Heat generated by braking the second clutch 23 raises the temperature of the oil more (than usual). Similarly, while the second transmission stage is selected and the second clutch 23 is engaged, controlling engagement force of the first clutch 22 generates braking force depending on the engagement force. Heat generated by braking the first clutch 22 raises the temperature of the oil more (than usual). Engagement and disengagement of the first clutch 22 and the second clutch 23, that is, control of engagement force, are performed by the EV-CU 60 described below.

An oil pan 25 is disposed at the bottom of the transmission 20 to store oil (lubricant) to be supplied to the components included in the transmission mechanism 21, such as the drive gears 211a and 212a, the driven gears 211b and 212b, the first clutch 22, and the second clutch 23. The oil supplied to the first clutch 22 or the second clutch 23 is heated and is returned to the oil pan 25.

An oil tank 26 is disposed in the transmission 20 to store oil drawn up from the oil pan 25 by the transmission mechanism 21 (including the drive gears 211a and 212a and the driven gears 211b and 212b). The oil tank 26 is formed of heat-insulating material, or all of the oil tank 26 except an opening is covered with heat-insulating material, achieving heat-retaining characteristics (providing heat retention). The oil tank 26 is capable of retaining heat in the oil for a few hours (that is, longer than the oil pan 25). Thus, the oil heated by the first clutch 22 or the second clutch 23 retains heat and is stored in the oil tank 26. The amount of oil in the transmission 20 is set to an amount larger than usual by the capacity of the oil tank 26.

A first oil path 41 is coupled to the oil tank 26 and joins the oil tank 26 and the inlet of a heat exchanger 40. A first valve 44 configured to open and close the first oil path 41 is disposed in the first oil path 41. While the first valve 44 is open, the oil stored in the oil tank 26 is supplied to the heat exchanger 40. Examples of the first valve 44 include an electromagnetically controlled shut-off valve. The first valve 44 is driven (opened and closed) by the EV-CU 60 described below.

An oil pump 46 is disposed downstream of the first valve 44 in the first oil path 41. The oil pump 46 is configured to pressurize and discharges oil. The discharged oil is pumped to the heat exchanger 40. Examples of the oil pump 46 include an electrically driven trochoid pump (internal gear pump).

The heat exchanger 40 has the inlet in communication with the oil tank 26 and is configured to exchange heat between the oil supplied from the oil tank 26 (that is, the oil that is heated and retains heat) and the battery 80 to heat the battery 80. The outlet of the heat exchanger 40 is in communication with the oil pan 25 with a third oil path 43 interposed therebetween. Accordingly, the oil transported to the heat exchanger 40 exchanges heat in the heat exchanger 40 (that is, heats the battery 80) and thereafter returns to the oil pan 25 via the third oil path 43.

A second oil path 42 is coupled to the oil tank 26 and joins the oil tank 26 and the oil pan 25. A second valve 45 configured to open and close the second oil path 42 is disposed in the second oil path 42. Opening the second valve 45 allows the oil stored in the oil tank 26 to return to the oil pan 25 directly (that is, without flowing through the heat exchanger 40). Examples of the second valve 45 include an electromagnetically controlled shut-off valve. The second valve 45 is driven (opened and closed) by the EV-CU 60.

The trailing end of the output shaft 212 of the transmission 20 is coupled to a differential 28 that includes a final gear 27 made of a pinion gear and a ring gear. The differential 28 is built into the transmission casing together with the pairs of gears (transmission mechanism 21) describe above.

The driving force that is output from the electric motor 10 is converted by the transmission 20 and is thereafter transmitted to wheels of a vehicle (drive wheels) 30L and 30R from the output shaft 212 of the transmission 20 via the differential (also referred to as the "diff" below) 28 and drive shafts 29L and 29R on the left and right sides, respectively.

Brakes 31L and 31R, respectively, (each of the brakes 31L and 31R is also collectively referred to as the brake 31 below) are attached to the wheels 30L and 30R (each of the wheels 30L and 30R is also collectively referred to as the wheel 30 below) to brake the wheels 30L and 30R. In addition, wheel speed sensors 32L and 32R, respectively, (each of the wheel speed sensors 32L and 32R is also collectively referred to as the wheel speed sensor 32 below) are attached to the wheels 30L and 30R to detect the revolution speed of the respective wheels.

The wheel speed sensor 32 is a contactless sensor configured to detect a change in a magnetic field produced by a rotor (gear rotor or magnetic rotor) configured to rotate together with the corresponding wheel 30, and, for example, a magnetic pickup, a Hall element, or a magnetoresistive (MR) element is used to detect the revolution of the rotor in some embodiments. The wheel speed sensor 32 is coupled to the EV-CU 60 described below. The wheel speed sensor 32 may be coupled to VDCU 50 described below.

Since the vehicle according to the embodiment is configured in this way, the wheels 30L and 30R are driven by the electric motor 10 in the vehicle. The electric motor 10 may also operate in a regeneration mode, for example, during braking.

The driving operation of the electric motor 10 as the driving force for the vehicle and the transmission operation of the transmission 20 are controlled by the EV-CU 60 in a comprehensive manner. The EV-CU 60 is coupled for bidirectional communication, via a controller area network (CAN) 100, to a unit such as a vehicle dynamics control unit (referred to as the "VDCU" below) 50 configured to improve traveling stability by reducing, for example, skidding of the vehicle. A transmission control unit (TCU) may be disposed, and the transmission operation of the transmission 20 described above may be controlled by the TCU.

The EV-CU 60 and the VDCU 50 each include a microprocessor for performing computing, an electrically erasable programmable read-only memory (EEPROM) for storing programs and other data for the microprocessor to perform various kinds of processing, a random-access memory (RAM) for storing various kinds of data including computation results, a back-up RAM for retaining the stored data in the RAM, and an input/output interface (I/F).

For example, a steering angle sensor 36, a front rear acceleration (front rear G) sensor 55, a lateral acceleration (lateral G) sensor 56, a yaw rate sensor 57, and a brake switch 58 are coupled to the VDCU 50. The front rear acceleration sensor 55 is configured to detect the acceleration applied to the vehicle in the front-rear direction, and the lateral acceleration sensor 56 is configured to detect the acceleration applied to the vehicle in the lateral direction. The steering angle sensor 36 is configured to detect the steered angle of the front wheels 30L and 30R, which are steered wheels, (that is, the steering angle of a steering wheel 35) by detecting a rotation angle of the pinion shaft. The yaw rate sensor 57 is configured to detect the yaw rate of the vehicle.

The VDCU 50 is configured to brake the vehicle by driving a brake actuator in accordance with the amount of operation (amount of depression) of the brake pedal, and the VDCU 50 is also configured to detect the behavior of the vehicle by using various sensors (for example, the wheel speed sensors 32, the steering angle sensor 36, the front rear acceleration sensor 55, the lateral acceleration sensor 56, and the yaw rate sensor 57) and perform brake control and motor torque control through automatic pressurizing to reduce skidding and achieve the vehicle stability during cornering. In short, the VDCU 50 is configured to reduce skidding and achieve good traveling stability, for example, when the vehicle enters a corner at an over speed or when the orientation (behavior) of the vehicle is disturbed, for example, by abrupt steering operation. Further, the VDCU 50 is configured to brake the vehicle (wheels 30) by driving a brake actuator in response to a braking request from the EV-CU 60 requesting braking the vehicle (wheels 30).

The VDCU 50 is configured to send to the EV-CU 60 via the CAN 100 information including the steering angle, the front rear acceleration, the lateral acceleration, and the yaw rate, which have been detected, and the braking information. The VDCU 50 is configured to receive information including a braking request from the EV-CU 60 via the CAN 100.

For example, various sensors are coupled to the EV-CU 60 including an accelerator pedal opening sensor 61 configured to detect the amount of depression of the accelerator pedal (degree of accelerator opening), a resolver 62 configured to detect the revolution position (revolution speed) of the electric motor 10, and the wheel speed sensor 32 configured to detect the speed of the wheel 30 described above. The temperature sensor 63, which is described above, configured to detect the temperature of the battery 80 is coupled to the EV-CU 60. An oil temperature sensor 64 configured to detect the temperature of the oil (oil temperature) is also coupled to the EV-CU 60, and an electric signal (voltage value) that depends on the temperature of the oil (oil temperature) is acquired by the EV-CU 60. In some embodiments, for example, a thermistor, which changes a resistance value with temperature is used as the oil temperature sensor 64.

The EV-CU 60 is configured to receive from the VDCU 50 via the CAN 100 various kinds of information including, for example, the steering angle, the front rear acceleration, the lateral acceleration, the yaw rate, and the braking information.

The EV-CU 60 is configured to control the driving operation of the electric motor 10 in a comprehensive manner based on the various kinds of information that are obtained. The EV-CU 60 is configured to calculate and output target torque (command value for torque) for the electric motor 10 based on, for example, the degree of opening of the accelerator pedal (driving force requested by a driver who drives the vehicle), the driving condition of the vehicle (such as the speed of the vehicle), and the state of charge (SOC) of the battery 80. As described above, the EV-CU 60 is configured to control the engagement and disengagement (control of engagement force) of the first clutch 22 and the second clutch 23 and the opening and closing of the first valve 44 and the second valve 45. In short, the EV-CU 60 may serve as a control unit in an aspect of the disclosure.

A power control unit (referred to as the "PCU" below) 70 is configured to drive the electric motor 10 based on the target torque (command value for torque) by using the inverter 70a. The inverter 70a is configured to convert the direct-current power from the battery 80 into three-phase alternating-current electric power and supplies the electric motor 10 with the three-phase alternating-current electric power. The inverter 70a is configured to, during regeneration, convert an alternating-current voltage generated by the electric motor 10 into a direct-current voltage and charge the battery 80.

The battery 80 has a tendency (characteristic) to increase in internal resistance and degrade in charging-discharging characteristics with a decrease in temperature. Thus, for example, when the temperature is low outside and the battery 80 is cold, it takes long to charge the battery. In addition, the battery 80 is unable to output high power in such a situation.

Thus, the EV-CU 60 configured to serve as a temperature-raising apparatus for the battery 80 may heat the battery 80 more efficiently without using the electric power of the battery 80 for powering the electric motor 10, that is, without degrading electricity efficiency. The EV-CU 60 is configured to control the engagement and disengagement (control of engagement force) of the first clutch 22 and the second clutch 23 and the opening and closing of the first valve 44 and the second valve 45 so as to heat the battery 80 more efficiently without using the electric power of the battery 80. The EV-CU 60 is configured to implement such operation through the execution, by the microprocessor, of programs stored in a component such as the EEPROM.

Figure 5:
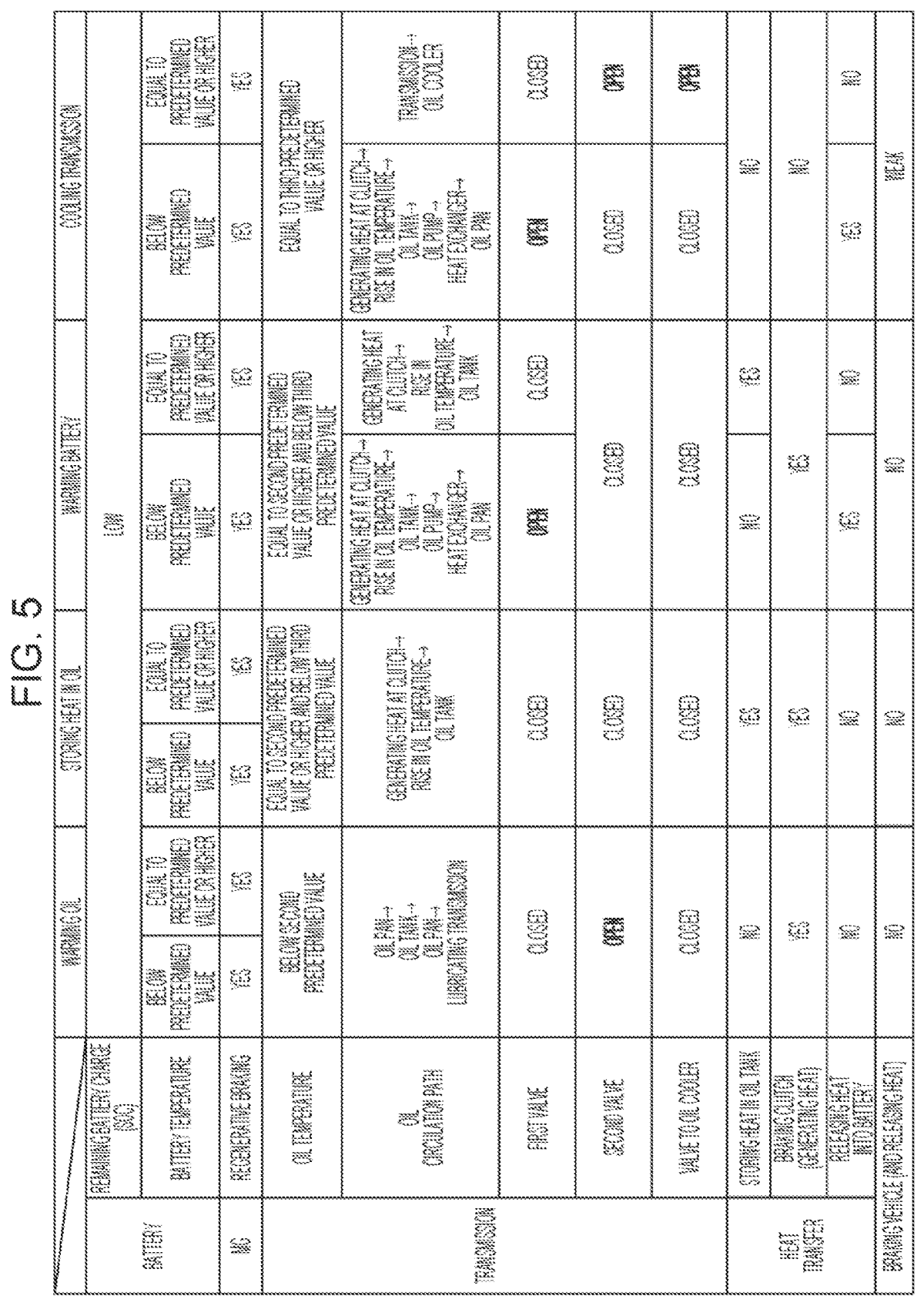

FIG. 4 illustrates Table 1 for describing operation of the battery-temperature raising apparatus 1 (EV-CU 60) (when the SOC is high and regeneration is not allowed). Similarly, FIG. 5 illustrates Table 2 for describing operation of the battery-temperature raising apparatus 1 (EV-CU 60) (when the SOC is low and regeneration is allowed). For example, FIG. 4 and FIG. 5 illustrate operation including the engagement and disengagement of the first and second clutches 22 and 23 and the opening and closing of the first and second valves 44 and 45 in each of the states (modes) of warming the oil, storing heat in the oil, warming the battery, and cooling the transmission (cooling the oil). Next, referring to both of FIG. 4 and FIG. 5, the operation of the battery-temperature raising apparatus 1 (EV-CU 60) will be described.

When the temperature of the oil (oil temperature) is below a third predetermined temperature, that is, when it is unnecessary to decrease the temperature of the oil to cool the transmission 20, the EV-CU 60 generates braking force (that is, generates heat) to heat the oil by engaging the first clutch 22 or the second clutch 23 (by controlling engagement force) depending on the amount of depression of the brake pedal (the amount of braking operation=the requested amount of braking).

For example, while the first transmission stage (transmission ratio) is selected and the first clutch 22 is engaged, the EV-CU 60 controls engagement force (oil pressure) of the second clutch 23 depending on the amount of depression of the brake pedal and generates braking force depending on the engagement force. Similarly, while the second transmission stage (transmission ratio) is selected and the second clutch 23 is engaged, the EV-CU 60 controls engagement force (oil pressure) of the first clutch 22 depending on the amount of depression of the brake pedal and generates braking force depending on the engagement force. These procedures increase the temperature of the oil, for example, to approximately 100 to 120° C. The normal oil temperature is, for example, approximately 80° C.

Figure 3:
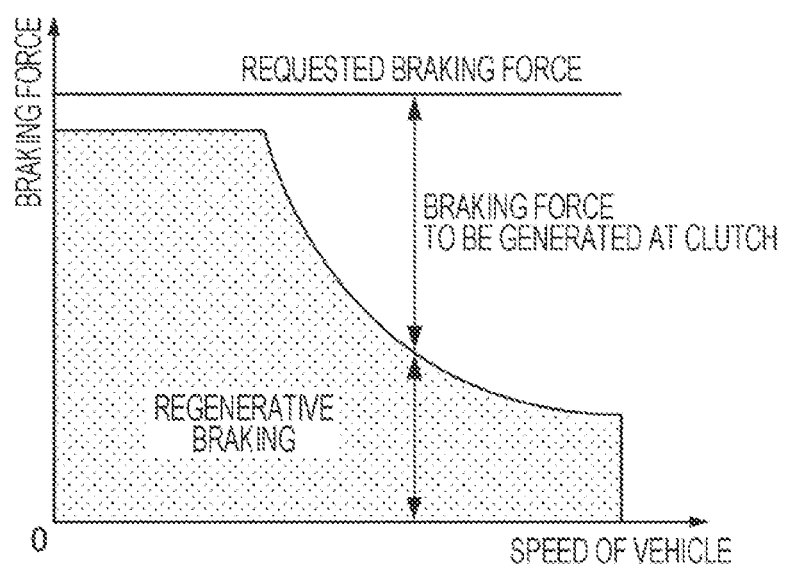
FIG. 3 illustrates a relationship between regenerative braking and braking force to be generated at a clutch.

In this situation (during braking), as illustrated in FIG. 3, the EV-CU 60 controls the engagement force of the first clutch 22 or the second clutch 23 (that is, generates the engagement force) by taking into account the braking force generated by the regenerative braking by the electric motor 10, in other words, so as to complement the braking force generated by the regenerative braking to achieve a requested braking force (target braking force) that depends on the amount of depression of the brake pedal. Accordingly, the kinetic energy of the vehicle is regenerated (recovered) without interfering with the regenerative operation (regenerative braking).

However, when braking the first clutch 22 or the second clutch 23 is not allowed (heat generation is not allowed) because the temperature of the oil is equal to the third predetermined value or higher and regeneration is impossible because the state of charge (SOC) of the battery 80 is sufficiently high (that is, the battery 80 is not rechargeable), the EV-CU 60 increases the braking force by the brake 31 attached to the wheel 30 (that is, increases the requested amount of braking for the VDCU 50) (refer to FIG. 4).

The oil heated in this way by heat generated by braking the first clutch 22 or the second clutch 23 is drawn from the oil pan 25 by the transmission mechanism 21 and is stored in the heat-retaining oil tank 26 disposed in the transmission 20.

Thereafter, (as illustrated in FIGS. 4 and 5), when the temperature of the oil is equal to the second predetermined temperature or higher and the oil is stored in the oil tank 26 and when the temperature of the battery 80 is below the predetermined temperature (upon receiving a predetermined request to heat the battery), the EV-CU 60 opens the first valve 44 and supplies the oil stored in the oil tank 26 (the oil that is heated and retains heat) to the heat exchanger 40. Then, heat exchange between the oil and the battery 80 heats the battery 80. In some embodiments, hysteresis is set as appropriate to the predetermined temperatures described above. As described above, the outlet of the heat exchanger 40 is coupled to the oil pan 25 with the third oil path 43 interposed therebetween, and the oil returns to the oil pan 25 after the heat exchange.

When the temperature of the oil (oil temperature) is below the second predetermined temperature (that is, for example, during the warming operation for the oil), the EV-CU 60 closes the first valve 44 and opens the second valve 45. Thereby, the warming operation for the oil is enhanced.

When the temperature of the battery 80 is equal to the predetermined temperature or higher and the temperature of the oil is equal to the third predetermined temperature or higher (when the oil is to be cooled), the EV-CU 60 closes the first valve 44 and opens the second valve 45. In some embodiments, the oil is cooled in this situation by an oil cooler (not illustrated) configured to cool the oil through heat exchange. In this way, the temperature of the oil is controlled, for example, in the range of 100 to 120° C. (that is, the temperature is controlled in a range such that the components and the oil in the transmission 20 are not damaged). Thus, the degradation of the components of the transmission 20 and the oil may be reduced without interfering with the cooling of the transmission 20.

As described above in detail, according to the embodiment, while the first transmission stage is selected and the first clutch 22 is engaged, the engagement force (oil pressure) of the second clutch 23 is controlled based on the amount of depression of the brake pedal (requested braking force), generating the braking force depending on the engagement force, and while the second transmission stage is selected and the second clutch 23 is engaged, the engagement force (oil pressure) of the first clutch 22 is controlled based on the amount of depression of the brake pedal (requested braking force), generating the braking force depending on the engagement force. Thus, the oil is further heated by the heat generated at the first clutch 22 or the second clutch 23. The oil heated by the heat generated by braking the first clutch 22 or the second clutch 23 is drawn from the oil pan 25 by the transmission mechanism 21 and is stored in the heat-retaining oil tank 26 disposed in the transmission 20. In short, the kinetic energy of the vehicle may be converted into thermal energy, and the thermal energy may be stored.

Thereafter, when the temperature of the battery 80 is below the predetermined temperature, the first valve 44 is opened, and the oil stored in the oil tank 26 is supplied to the heat exchanger 40, leading to heat exchange between the oil and the battery 80 and an increase in the temperature of the battery 80. Consequently, the temperature of the battery 80 may be raised (controlled) more efficiently without using the electric power of the battery 80 for powering the electric motor 10, that is, without degrading electricity efficiency. Further, the charging time of the battery 80 may be reduced, and the output power may be increased as a result.

According to the embodiment, the engagement force of the first clutch 22 or the second clutch 23 is controlled (that is, the engagement force is generated) with the braking force generated by the regenerative braking by the electric motor 10 taken into account, in other words, in such a manner that the braking force generated by the regenerative braking is complemented to achieve a requested braking force (target braking force). Accordingly, the kinetic energy of the vehicle may be regenerated (recovered) without interfering with the regenerative operation (regenerative braking).

According to the embodiment, when the temperature of the oil (oil temperature) is below the second predetermined temperature (that is, for example, during the warming operation for the oil), the first valve 44 is closed, and the second valve 45 is opened. Accordingly, the warming of the oil may be enhanced. When the temperature of the battery 80 is equal to the predetermined temperature or higher and the temperature of the oil is equal to the third predetermined temperature or higher (when the oil is to be cooled), the first valve 44 is closed, and the second valve 45 is opened. Accordingly, the cooling of the transmission 20 is not interfered with, and the degradation of the oil may be reduced.

The embodiment of the disclosure has been described as above, but the embodiment of the disclosure is not limited to the embodiment described above, and various modifications are possible. For example, the description has been given with regard to an example in which the embodiment is applied to a battery electric vehicle (BEV) including a single motor, but the embodiment may be applied to, for example, a battery electric vehicle (BEV) including two motors, a hybrid electric vehicle and a plug-in hybrid electric vehicle (HEV and P-HEV), and a fuel cell vehicle (FCV).

The description has been given with regard to an example in which the embodiment is applied to a two-wheel-drive (2WD) vehicle, but the embodiment may be applied to, for example, an all-wheel-drive (AWD) vehicle. Further, the system or the mechanism of the transmission 20 is not limited to the embodiment described above (two-stage transmission). For example, a speed reducer (one stage) or a transmission having three or more stages may be used.

Further, instead of the configuration in which the braking force is generated by using the first clutch 22 or the second clutch 23, for example, a brake may be disposed between the casing of the differential 28 and the final gear 27, which are disposed downstream of the transmission mechanism 21, to decelerate the revolution of the final gear 27, and the braking force may be generated by controlling the engagement force of the brake depending on the amount of depression of the brake pedal (requested braking force). Similarly to the above embodiment, the temperature of the battery 80 may also be raised more efficiently in this way without using the electric power of the battery 80, that is, without degrading electricity efficiency.

The system configurations of the controllers including the EV-CU 60 and the VDCU 50 and, for example, the role sharing by the controllers are not limited to the embodiment described above. For example, the wheel speed sensor 32 is coupled to the EV-CU 60 in the embodiment but may be coupled to the VDCU 50, and data may be sent to the EV-CU 60 via the CAN 100. The EV-CU 60, the PCU 70, and the VDCU 50 are coupled to each other for bidirectional communication using the CAN 100 in the embodiment, but the system configuration is not limited to the above example and may freely be modified (such as integrated) in consideration of functional conditions, costs, and other factors. For example, a transmission control unit (TCU), which is configured to control the transmission 20 (the first clutch 22, the second clutch 23, the first valve 44, and the second valve 45) in a comprehensive manner, may be included in the configuration.

The battery-temperature raising apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the battery-temperature raising apparatus 1 including the VDCU 50, the EV-CU 60, and the PCU 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC)

customized to perform, and the FPGA is an integrated circuit designed to be configured after manufacturing in order to perform, all or a part of the functions of the modules illustrated in FIG. 1.

The invention claimed is:

1. A battery-temperature raising apparatus comprising:
   a battery configured to supply electric power to an electric motor configured to generate driving force for a vehicle;
   a transmission comprising a transmission mechanism and a clutch, the transmission mechanism being configured to convert torque provided by the electric motor and output the converted torque, the clutch being configured to brake a wheel of the vehicle through engagement;
   an oil pan disposed at a bottom of the transmission and configured to store oil to be supplied to the transmission mechanism and the clutch;
   an oil tank capable of retaining heat and disposed in the transmission and configured to store the oil drawn up from the oil pan by the transmission mechanism;
   a heat exchanger comprising an inlet in communication with the oil tank and an outlet in communication with the oil pan, the heat exchanger being configured to exchange heat between the battery and the oil;
   a first valve disposed in a first oil path joining the oil tank and the inlet of the heat exchanger, the first valve being configured to open and close the first oil path;
   a temperature sensor configured to detect a temperature of the battery; and
   a control unit configured to control engagement and disengagement of the clutch and opening and closing of the first valve,
   wherein the control unit is configured to
   generate braking force by controlling engagement force of the clutch depending on an amount of depression of a brake pedal of the vehicle, and
   supply the oil stored in the oil tank to the heat exchanger by opening the first valve when the temperature of the battery is below a predetermined temperature.

2. The battery-temperature raising apparatus according to claim 1,
   wherein the control unit is configured to generate the braking force by controlling the engagement force of the clutch so as to complement braking force by regenerative braking by the electric motor during braking.

3. The battery-temperature raising apparatus according to claim 2,
   wherein the clutch at least comprises a first clutch configured to select a first transmission stage and a second clutch configured to select a second transmission stage, and
   the control unit is configured to
   generate the braking force by controlling engagement force of the second clutch depending on the amount of depression of the brake pedal while the first transmission stage is selected and the first clutch is engaged, and
   generate the braking force by controlling engagement force of the first clutch depending on the amount of depression of the brake pedal while the second transmission stage is selected and the second clutch is engaged.

4. The battery-temperature raising apparatus according to claim 2,
   wherein the clutch is a brake configured to decelerate a revolution of a final gear included in a differential disposed downstream of the transmission mechanism, and
   the control unit is configured to generate the braking force by controlling the engagement force of the brake depending on the amount of depression of the brake pedal.

5. The battery-temperature raising apparatus according to claim 4, further comprising:
   a second valve disposed in a second oil path joining the oil tank and the oil pan, the second valve being configured to open and close the second oil path,
   wherein the control unit is configured to open the second valve (i) when a temperature of the oil is below a second predetermined temperature; or (ii) when the temperature of the battery is equal to the predetermined temperature or higher and the temperature of the oil is equal to a third predetermined temperature or higher.

* * * * *